(12) United States Patent
Deng et al.

(10) Patent No.: US 11,177,638 B2
(45) Date of Patent: Nov. 16, 2021

(54) CABLE FOIL PROCESSING EQUIPMENT

(71) Applicants: Tyco Electronics (Shanghai) Co. Ltd., Shanghai (CN); TE Connectivity Services GmbH, Schaffhausen (CH)

(72) Inventors: Yingcong Deng, Shanghai (CN); Yuting He, Kunshan (CN); Yun Liu, Shanghai (CN); Tao Li, Shanghai (CN); Dandan Zhang, Shanghai (CN); Roberto Francisco-Yi Lu, Bellevue, WA (US)

(73) Assignees: Tyco Electronics (Shanghai) Co. Ltd., Shanghai (CN); TE Connectivity Services GmbH, Schaffhausen (CH)

( * ) Notice: Subject to any disclaimer, the term of this patent is extended or adjusted under 35 U.S.C. 154(b) by 0 days.

(21) Appl. No.: 17/124,721

(22) Filed: Dec. 17, 2020

(65) Prior Publication Data
US 2021/0194225 A1 Jun. 24, 2021

(30) Foreign Application Priority Data
Dec. 20, 2019 (CN) .......................... 201922309271.6

(51) Int. Cl.
*B23P 19/00* (2006.01)
*H02G 1/12* (2006.01)
*H01R 43/28* (2006.01)

(52) U.S. Cl.
CPC ............. *H02G 1/127* (2013.01); *H01R 43/28* (2013.01); *Y10T 29/532* (2015.01)

(58) Field of Classification Search
CPC .... H01B 11/1817; H01B 9/02; H01R 12/775; H02G 1/1217; H02G 1/126; Y10T 29/49123; Y10T 29/49117; Y10T 29/4919; Y10T 29/514; Y10T 29/49192; Y10T 29/53261; Y10T 29/532
USPC ......... 29/745, 33 M, 564.4, 566.1, 749, 759, 29/827, 828, 863, 867
See application file for complete search history.

(56) References Cited

U.S. PATENT DOCUMENTS 5,581,885 A * 12/1996 Dalton ................. H02G 1/1226
30/90.1
10,784,663 B2 * 9/2020 Messina ............... H02G 1/1265

* cited by examiner

*Primary Examiner* — Thiem D Phan
(74) *Attorney, Agent, or Firm* — Barley Snyder

(57) ABSTRACT

A cable foil layer processing equipment includes a rack, a knife holder installed on the rack, a plurality of cutters movably installed on the knife holder and arranged in a crisscross manner in a vertical plane, and a linear moving mechanism configured to move linearly in a horizontal direction parallel to an axial direction of a cable. The rack is installed on the linear moving mechanism so as to move linearly in the horizontal direction along with the linear moving mechanism. The cutters clamp a foil layer of the cable in a radial direction of the cable. The linear moving mechanism drives the knife holder to move in the horizontal direction so as to cut the foil layer of the cable into a plurality of equal parts.

16 Claims, 2 Drawing Sheets

CABLE FOIL PROCESSING EQUIPMENT

CROSS-REFERENCE TO RELATED APPLICATION

This application claims the benefit of the filing date under 35 U.S.C. § 119(a)-(d) of Chinese Patent Application No. 201922309271.6, filed on Dec. 20, 2019.

FIELD OF THE INVENTION

The present disclosure relates to a processing equipment and, more particularly, to a cable foil processing equipment.

BACKGROUND

A foil layer of a cable (also referred to as the shielding layer) may shield interference signals and should not be damaged during the cable assembly process. In the traditional cable assembly process, in order to facilitate the operation, an exposed segment of the foil layer is usually cut directly from the cable. In the fully automatic cable assembly process, the exposed segment cannot be cut off from the foil layer, and the exposed segment of the foil layer is split into multiple parts in the axial direction of the cable. In the prior art, workers usually hold a blade to manually cut the exposed segment of the foil layer of the cable. This manual cutting method is inefficient and has poor cutting quality.

SUMMARY

A cable foil layer processing equipment includes a rack, a knife holder installed on the rack, a plurality of cutters movably installed on the knife holder and arranged in a crisscross manner in a vertical plane, and a linear moving mechanism configured to move linearly in a horizontal direction parallel to an axial direction of a cable. The rack is installed on the linear moving mechanism so as to move linearly in the horizontal direction along with the linear moving mechanism. The cutters clamp a foil layer of the cable in a radial direction of the cable. The linear moving mechanism drives the knife holder to move in the horizontal direction so as to cut the foil layer of the cable into a plurality of equal parts.

BRIEF DESCRIPTION OF THE DRAWINGS

The invention will now be described by way of example with reference to the accompanying Figures, of which.

DETAILED DESCRIPTION OF THE EMBODIMENTS

Figure 1:
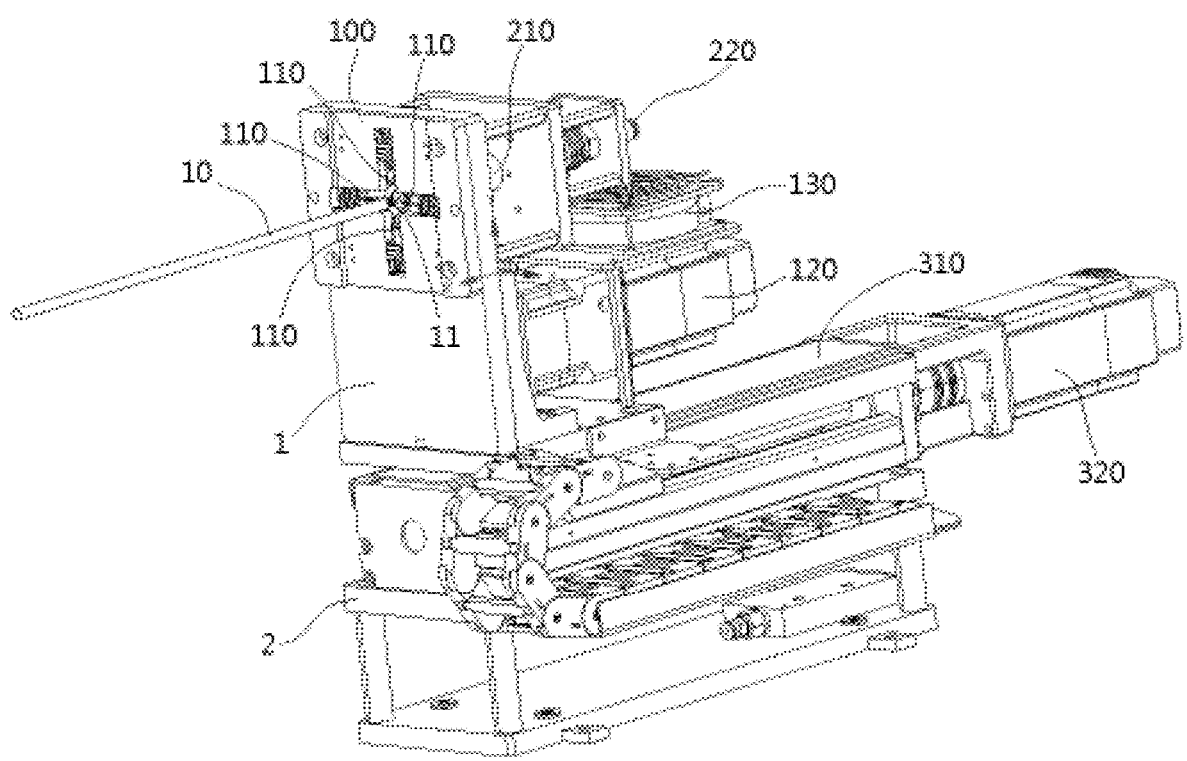
FIG. 1 is a perspective view of a cable foil layer processing equipment according to an embodiment.

The technical scheme of the disclosure is further described in detail by the following embodiments with reference to the accompanying drawings. In the specification, the same or similar reference numerals denote the same or similar components. The following description of the embodiments of the present disclosure with reference to the accompanying drawings is intended to explain the general inventive concept of the disclosure and should not be construed as a limitation of the present disclosure.

In addition, in the following detailed description, for purposes of explanation, numerous specific details are set forth in order to provide a thorough understanding of the embodiments of the disclosure. However, it may be evident, that one or more embodiments may be practiced without these specific details. In other instances, well-known structures and devices are shown in schematic form in order to simplify the drawing.

A cable foil layer processing equipment according to an embodiment is shown in FIG. 1. The cable foil layer processing equipment includes a fixing clamp, a rack 1, a knife holder 100, four cutters 110, and a linear moving mechanism 310. The fixing clamp is configured to clamp and fix a cable 10 to be processed. The knife holder 100 is installed on the rack 1. The four cutters 110 are movably installed on the knife holder 100 and arranged in a crisscross manner in a vertical plane. The linear moving mechanism 310 is configured to move linearly in a horizontal direction parallel to the axial direction of the fixed cable 10. The rack 1 is installed on the linear moving mechanism 310 so as to move linearly in the horizontal direction along with the linear moving mechanism 310.

Figure 2:
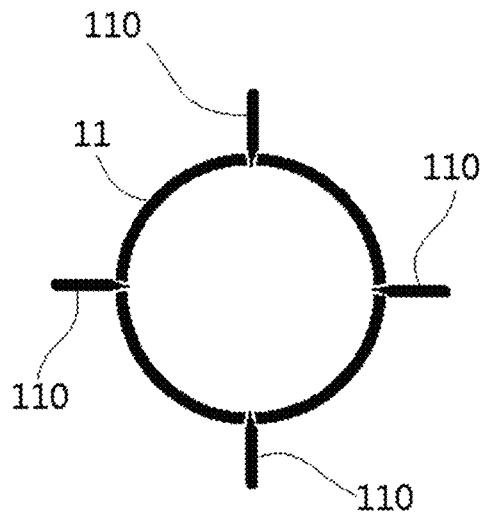
FIG. 2 is a schematic end view of a foil layer of a cable being cut into equal parts by cutters of the cable foil layer processing equipment.
Figure 4:
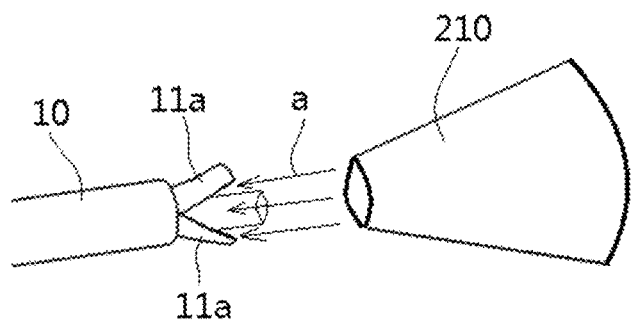
FIG. 4 is a schematic perspective view of the foil layer being flared outward under the pressurized air flow ejected by the air jet device.

As shown in FIG. 1, when the four cutters 110 clamp a foil layer 11 of the cable 10 in the radial direction of the cable 10, the linear moving mechanism 310 drives the knife holder 100 to move in the horizontal direction, and thereby four longitudinal slits f parallel to the central axis of the cable 10 are simultaneously cut out on the foil layer 11 of the cable 10 (see FIGS. 2 and 4), so as to cut the foil layer 11 of the cable 10 into four equal parts 11a (see FIGS. 2 and 4). The foil layer 11 can be automatically cut into four equal parts 11a at the same time, which improves the cutting efficiency and cutting quality.

Figure 3:
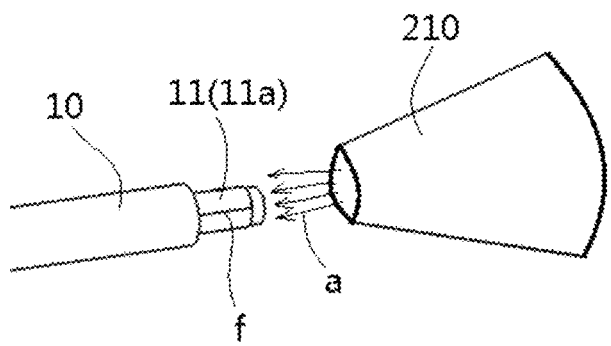
FIG. 3 is a schematic perspective view of ejecting air toward the foil layer of the cable with an air jet device of the cable foil layer processing equipment.

As shown in FIGS. 1, 3, and 4, in the illustrated embodiment, the cable foil layer processing equipment further comprises an air jet device 210, 220 installed on the rack 1. The air jet device 210, 220 is adapted to jet a pressurized air flow 'a' in the axial direction of the cable 10 toward the foil layer 11 of the cable 10 that has been cut into four equal parts so that the foil layer 11 that has been cut into four equal parts is flared outward under the impact of the pressurized air flow.

As shown in FIGS. 1, 3, and 4, the air jet device 210, 220 includes a nozzle 210 and an air source 220. The air source 220 is connected to the nozzle 210 for supplying pressurized air to the nozzle 210. The pressurized air is ejected in the form of a pressurized air flow f via the nozzle 210. The nozzle 210 faces an end of the cable 10, and the central axis of the nozzle 210 coincides with the central axis of the cable 10. A diameter of the outlet of the nozzle 210 is slightly larger than a diameter of the cable 10 to ensure that the foil layer 11 that has been cut into four equal parts can be flared outward under the impact of the pressurized air flow f. The air pressure of the air source 220 is adjustable so that the pressure of the pressurized air flow f ejected from the outlet of the nozzle 210 is adjustable. In an embodiment, the nozzle 210 is installed on the rack 1 movably in the horizontal direction, so that the distance between the nozzle 210 and the end of the cable 10 is adjustable.

As shown in FIGS. 1 and 2, the cable foil layer processing equipment includes a cutter driving device installed on the rack 1. The cutter driving device is adapted to drive the four cutters 110 to move synchronously to clamp or loosen the foil layer 11 of the cable 10. The cutter driving device includes a driving motor 120 and a transmission mechanism installed between the driving motor 120 and the four cutters 110. The driving motor 120 is configured to drive the four cutters 110 to move synchronously by the transmission mechanism.

As shown in FIG. 1, in the illustrated embodiment, the cable foil layer processing equipment further comprises a cooling fan 130 installed on the rack 1. The cooling fan 130 is configured to cool the driving motor 120.

As shown in FIG. 1, in the illustrated embodiment, the cable foil layer processing equipment includes a servo motor 320, which is configured to drive the linear moving mechanism 310 to move linearly in the horizontal direction.

As shown in FIG. 1, in the illustrated embodiment, the cable foil layer processing equipment further comprises a base 2. The linear moving mechanism 310 and the servo motor 320 are installed on the base 2.

Those skilled in the art will appreciate that the above-described embodiments are illustrative and can be modified by those skilled in the art, and that the structures described in the various embodiments can be freely combined without conflict in structure or principle. Although the present disclosure has been described with reference to the accompanying drawings, the embodiments disclosed in the drawings are intended to be illustrative explanations of the embodiments of the disclosure, and should not be construed as limiting the disclosure. Although a few embodiments of the present general inventive concept have been shown and described, it would be appreciated by those skilled in the art that changes may be made in these embodiments without departing from the principles and spirit of the present general inventive concept, and the scope of the present disclosure is defined by the claims and their equivalents.

What is claimed is:

1. A cable foil layer processing equipment, comprising:
   a rack;
   a knife holder installed on the rack;
   a plurality of cutters movably installed on the knife holder and arranged in a crisscross manner in a vertical plane; and
   a linear moving mechanism configured to move linearly in a horizontal direction parallel to an axial direction of a cable, the rack is installed on the linear moving mechanism so as to move linearly in the horizontal direction along with the linear moving mechanism, the cutters clamp a foil layer of the cable in a radial direction of the cable, the linear moving mechanism drives the knife holder to move in the horizontal direction so as to cut the foil layer of the cable into a plurality of equal parts.

2. The cable foil layer processing equipment of claim 1, further comprising a fixing clamp configured to clamp and fix the cable.

3. The cable foil layer processing equipment of claim 1, further comprising an air jet device installed on the rack.

4. The cable foil layer processing equipment of claim 3, wherein the air jet device is adapted to jet a pressurized air flow in the axial direction of the cable toward the foil layer of the cable that has been cut into equal parts so that the foil layer is flared outward under the pressurized air flow.

5. The cable foil layer processing equipment of claim 4, wherein the air jet device includes a nozzle and an air source.

6. The cable foil layer processing equipment of claim 5, wherein the air source is connected to the nozzle for supplying a pressurized air to the nozzle, the pressurized air is ejected as the pressurized air flow via the nozzle.

7. The cable foil layer processing equipment of claim 6, wherein the nozzle faces an end of the cable and a central axis of the nozzle coincides with a central axis of the cable.

8. The cable foil layer processing equipment of claim 7, wherein a diameter of an outlet of the nozzle is larger than a diameter of the cable.

9. The cable foil layer processing equipment of claim 6, wherein a pressure of the pressurized air of the air source is adjustable so that a pressure of the pressurized air flow ejected from the nozzle is adjustable.

10. The cable foil layer processing equipment of claim 6, wherein the nozzle is installed on the rack movably in the horizontal direction and a distance between the nozzle and an end of the cable is adjustable.

11. The cable foil layer processing equipment of claim 1, further comprising a cutter driving device installed on the rack, the cutter driving device drives the cutters to move synchronously to clamp or loosen the foil layer of the cable.

12. The cable foil layer processing equipment of claim 11, wherein the cutter driving device has a driving motor and a transmission mechanism installed between the driving motor and the cutters.

13. The cable foil layer processing equipment of claim 12, wherein the driving motor is configured to drive the cutters to move synchronously by the transmission mechanism.

14. The cable foil layer processing equipment of claim 13, further comprising a cooling fan installed on the rack, the cooling fan cools the driving motor.

15. The cable foil layer processing equipment of claim 1, further comprising a servo motor configured to drive the linear moving mechanism to move linearly in the horizontal direction.

16. The cable foil layer processing equipment of claim 15, further comprising a base on which the linear moving mechanism and the servo motor are installed.

* * * * *